Figure 1:
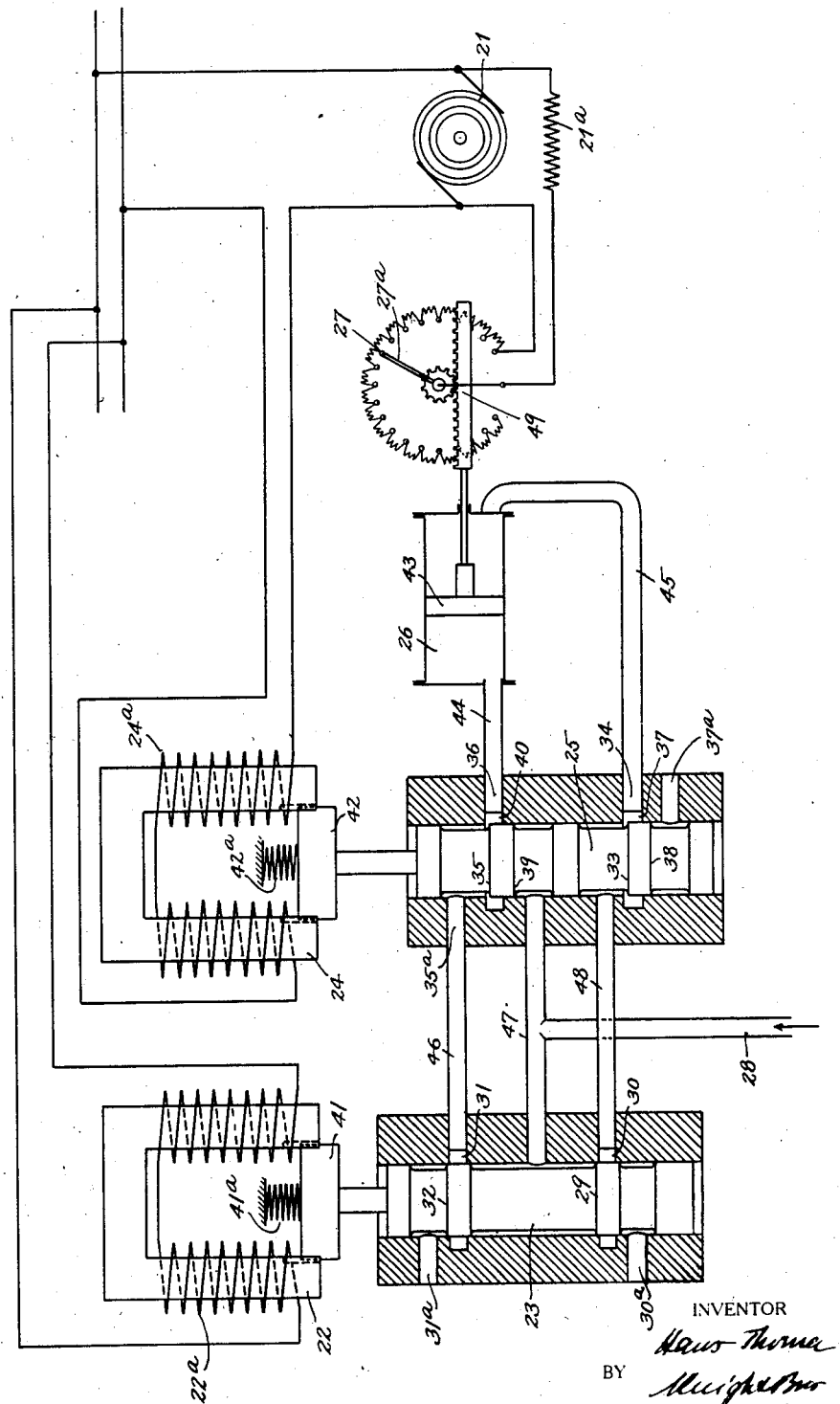

Feb. 21, 1928.

H. THOMA 1,659,752

MULTIPLE CONTROLLED HYDRAULIC SERVO MOTOR

Filed March 14, 1924 2 Sheets-Sheet 1

INVENTOR
Hans Thoma
BY
his ATTORNEYS

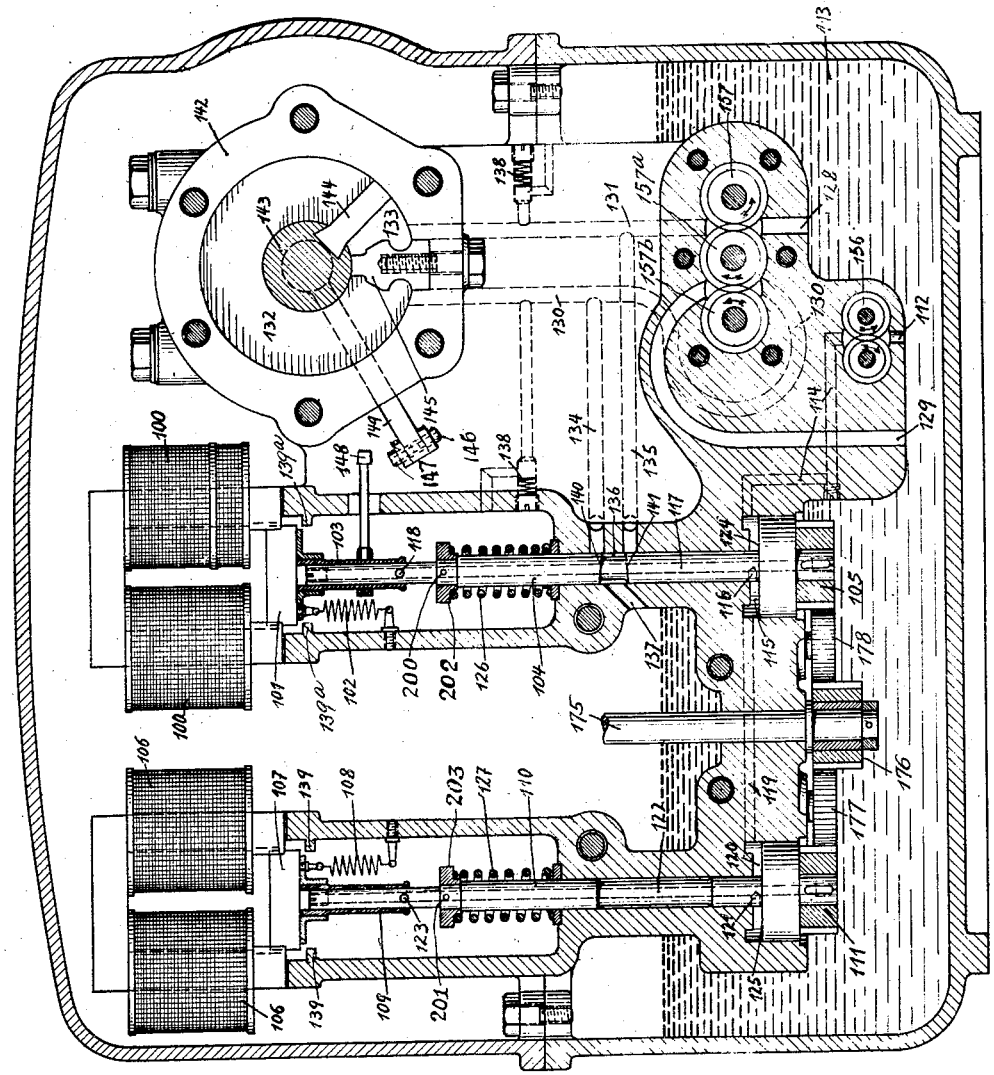

Patented Feb. 21, 1928.

1,659,752

UNITED STATES PATENT OFFICE.

HANS THOMA, OF MUNICH, GERMANY, ASSIGNOR TO NEUFELDT & KUHNKE, OF RAVENSBERG, NEAR KIEL, GERMANY, A GERMAN CORPORATION.

MULTIPLE-CONTROLLED HYDRAULIC SERVO-MOTOR.

Application filed March 14, 1924, Serial No. 699,348, and in Germany May 17, 1921.

My invention relates to the control of servo motors which are operated by fluid pressure, such as water or oil and which for their control require a very carefully checked and regulated admission of the pressure fluid in order to respond with sufficient accuracy to the initial primary control operation, which in most cases is not sufficiently powerful to directly operate the valves for admitting the pressure fluid to the motor. In many cases it is also desired to make the servo motor control dependent upon a plurality of primary control elements such that the servo motor may be capable of responding to a plurality of varying conditions of the system to which the servo motor is attached and which it is assumed to regulate.

For instance, it may be desirable to operate in an electric power transmission system the rheostats which control the output of the generator, in accordance with the voltage on the main lines irrespective of the generator output, by means of the voltage responsive relay, and to limit the output beyond a predetermined amount by means of the current responsive relay. In such cases usually a so-called servo motor is employed, that is to say, an auxiliary motor of comparatively small power which mechanically operates such rheostats or the like, and in turn, this auxiliary motor is controlled by means responsive for instance to the current or voltage generated. Such auxiliary motors are usually termed servo motors, and in the present day art servo motors operated by fluid pressure are employed.

The particular novel feature relating to the control of such servo motors and forming the subject matter claimed in the present invention is an arrangement by which the servo motor may be controlled by a plurality of initial or primary control elements, such as for instance relays, each of which is designed to respond at a given condition. For instance one relay may by its response to the line voltage variations keep the voltage constant at varying line currents, whereas the other relay may respond at a maximum desired line current and actuate the servo motor irrespective of the voltage relay.

The disclosure made in the present application also includes certain other features, incident to the control mechanism, such as an improved relay armature suspension which is however more particularly disclosed and claimed in the U. S. Patent No. 1,629,324, granted to me on May 17, 1927, on an application divided from the present application.

Referring to the accompanying drawing:—

Figure 1 shows diagrammatically the general arrangement of the multiple control of a servo motor; and Figure 2 shows in longitudinal central vertical section a complete commerical form of servo motor control, embodying the several novel features of my invention.

In automatically controlled hydraulic servo motors, it is frequently desirable to employ more than a single "primary control element", by which I mean for instance a relay or the like, which receives the initial indication from the power plant as to its condition, such as the rise and fall of the voltage. In case only one single primary control element is employed the disadvantage exists that then the servo motor will not respond for instance to the variations in current, in case the voltage should remain the same and if the initial single control element is designed to only respond to the voltage. Therefore, according to the present invention a plurality of primary control elements, independent of each other so far as their response to different plant conditions is concerned, are provided, all of which primary control elements, by means of a corresponding plurality of control valves, effect the control of the servo motor. For instance, in controlling electric generators this renders it possible to hold the voltage constant by one primary control element, and on the other hand, to control the maximum current output by a second primary control element irrespective of the voltage condition in the output circuit, so that the servo motor will thus respond simultaneously to voltage and current variations.

In accordance with the hydraulic servo motor here concerned, aside from the main control valve, two or more primary control valves are provided, each of which latter responds to its own primary control element. The general arrangement of such a system is diagrammatically illustrated in Figure 1. In this figure, 21 represents the generator to be controlled, 21ª its field coil, the energization of which may be controlled by means of the rheostat 27. It is the object in this system to maintain the voltage of the generator 21 constant and at the same time to control the excitation of the generator in case of overload and irrespectively of the voltage such that the current generated will not exceed a certain desired value. The servo motor itself is here shown as a cylinder 26 in which a piston 43 is disposed. To the piston is connected the rack and pinion movement 49 which operates the arm 27$^a$ of rheostat 27 in one or the other direction, according to the direction in which the servo motor piston is moved. In order to accomplish the purpose desired a primary control element 22, responsive to voltage variations in the generator output circuit, is provided in the form of two coils 22$^a$ connected across the mains of the generator, and which energize the electromagnet 22 in accordance with the value of the voltage. Armature 41 is disposed partly within the poles of the electromagnet, a spring 41$^a$ tending to push the armature out from between the poles. To armature 41 is connected the control piston 23.

The other primary control element consists of the electromagnet 24, having its coils 24$^a$ in series with the mains of the generator. Between the poles of magnet 24 is disposed armature 42, a spring 42$^a$ tending to push the armature out from between the poles. To armature 42 is connected the piston valve 25. By means of conduit 28, pressure fluid is supplied to both pistons 23 and 25. Now in case the voltage of the current generated should drop, armature 41 will drop so that piston valve 23 will move slightly downward. This permits the pressure fluid supplied to the contracted portion in the center of piston 23, to flow past the edge 29 of the piston and through port 30 and duct 48 into the contracted portion of piston 25, this piston being assumed in a position such that the pressure fluid may flow past edge 33 of this piston and through port 34 into duct 45 through which it is supplied to the right hand side of servo motor piston 43. The pressure fluid supplied to the left hand side of this piston will find at that time a discharge passage through duct 44, port 36, past edge 35 of piston 25, port 35$^a$, duct 46, port 31 past edge 32 of piston 23 (which as previously stated has dropped a certain distance) around the contracted portion of piston 23 and out through discharge port 31$^a$. Thus the pressure fluid supplied through conduit 45 may move the piston 43 to the left, which in turn will move rheostat arm 27$^a$ a sufficient extent to bring the voltage back to normal. On the other hand, in case the voltage has remained constant, but the current has exceeded a certain predetermined value, the current responsive primary control element, namely, electromagnet 24 is more strongly energized so that it will further attract its armature 42 which will now raise piston valve 25, so that thereby at the edges 33 and 35 of piston 25 communication with the other control piston 23 is closed. At the same time irrespective of the position which piston 23 may have assumed at that time, the right hand side of servo motor piston 43 is connected with discharge port 37$^a$ through conduit 45, port 34, edges 37 and 38, so that the pressure fluid can escape, whereas the left hand side of servo motor piston 43 is connected with the pressure fluid supply 28 by means of conduit 47, piston edge 39 which then has been raised above edge 40 of port 36 so that the pressure fluid can now flow through port 36 and conduit 44 to the left hand side of piston 43. This will move the servo motor piston to the right and thus add more resistance to the field coils and the excitation will be diminished until the desired current output is restored.

The manner in which these several improvements and others to be referred to hereinafter, may be embodied in a commercial form of servo motor, is shown in Figure 2. In this figure, a longitudinal vertical section of a casing 113 is shown which contains the entire mechanism. The casing is filled with suitable fluid, for instance oil, approximately to the height shown. The voltage responsive coils 106, which may be the equivalent of coils 22$^a$ in Figure 1, may be connected across the supply mains of the generator to be controlled, and the current responsive coils 100 may be connected in series with the generator mains as is shown with reference to coils 24$^a$ in Figure 1. The servo motor 142 in this case is of the rotary type, having disposed inside of the cylindrical casing a vane 144 rotating with motor shaft 143, which in turn may be assumed to be connected to the shaft of a rheostat arm such as for instance to arm 27$^a$ in Figure 1. The cylindrical space inside casing 132 is defined circumferentially by a radial partition 145 running in the direction of the cylinder axis from end to end of the casing. By vane 144 this cylindrical space is divided into two chambers 132 and 133. In chamber 132 terminates the fluid pressure supply conduit 130 and in chamber 133 terminates supply conduit 131. Between the poles of electromagnet 100 is disposed an armature 101 which may be constructed and disposed in the manner shown in Figures 4 and 4$^a$ described hereinbefore, that is to say, this armature may be kept floating by means of a sleeve 103 on the upper end of a piston valve 104 which is slowly rotated by means of gears 176, 178 and 105. Gear 176 is rotated by means of shaft 175 from a source of power not shown here. Springs 102 (of which only one is shown in Figure 2) are provided to oppose the attraction of armature 101 by the electromagnet. Armature 107 of electromagnet 106 is similarly constructed and disposed, namely, it is kept floating by means of a sleeve 109 upon the upper end of a rotating piston 110 which is rotated by means of gears 177 and 111 through main driving gear wheel 176. Springs 108 (of which only one is shown) are provided to counteract the upward pull of the electromagnet against armature 107. Sleeve 103 of armature 101 previously mentioned, aside from serving as a vertical guide for armature 101 also serves at its lower rim as a control for port 118. This port is the terminal of a central passage 117 through piston valve 104 through which auxiliary pressure fluid is supplied from a small rotary pump 156 through duct 114 into annular space 115. This space is formed by means of the enlarged portion 124 of piston valve 104, the auxiliary pressure fluid being supplied from this annular space through opening 116 into central boring 117, whence it may be discharged through port 118 according to the position of sleeve 103, whereby the position of piston valve 104 may be regulated. A spring 126 is provided to counteract the pressure exerted against piston valve portion 124 by the auxiliary pressure fluid. This spring 126 rests at its lower end against the frame of the apparatus and bears at its upper end against a collar 202 pinned to piston valve 104 as shown at 200. Piston valve 110 is similarly constructed. At its lower end it is provided with an enlarged piston portion 125 which with the casing in which it is disposed, forms the annular space 120 in which a duct 119 terminates through which auxiliary fluid pressure is supplied from auxiliary pump 156 by way of annular space 115. From annular space 120 the auxiliary pressure fluid passes through central boring 122 of piston 110 upward and may be discharged through port 123 which in turn is controlled by the lower rim of sleeve 109. Thus according to the position which sleeve 109 assumes through the control by armature 107 more or less auxiliary pressure fluid will be discharged from port 123. The auxiliary oil pressure against piston 125 is counteracted by a spring 127, bearing against collar 203 pinned to the piston valve as shown at 201. It is assumed in this construction that springs 126 and 127 are adjusted for the same tension. This has the result that both control piston valves 104 and 110 which themselves are of the same size and have the same size enlargements 124 and 125 are influenced by the same forces, namely, the auxiliary oil pressure in one direction, and their respective springs in the other direction. Consequently so long as port 123 remains closed by means of sleeve 109, owing to the particular armature position, both control piston valves 104 and 110 follow the movements of cap or sleeve 103. That is to say, if sleeve 103 opens port 118 further so that the auxiliary fluid pressure is reduced, springs 126 and 127 will raise their respective piston valves. If port 118 is throttled, that is to say, when sleeve 103 drops, the pressure is correspondingly increased and both control piston valves 104 and 110 drop simultaneously. Owing to the fact that both ports 118 and 123 are arranged in parallel, that is to say, since auxiliary pressure fluid may be discharged through each of them, either sleeve 103 or 109 may be used individually for controlling the auxiliary pressure fluid. Thus either electric primary control element may bring about by itself alone an upward movement of the two control piston valves 104 and 110, but the downward movement of these control pistons can be brought about only jointly by both sleeves 103 and 109. Obviously this is true for the reason that in case one of these two sleeves should be in a position in which it has partially or wholly uncovered its port, the other sleeve by moving downward and thus covering its port could not sufficiently increase the auxiliary fluid pressure to bring about a downward movement of the two piston valves 110 and 104 until the other sleeve sufficiently covers its respective port, thereby sufficiently increasing the fluid pressure in the auxiliary system to bring about this downward movement of the two piston valves against springs 126, 127.

The advantages occurring from such an arrangement are as follows. Let us assume for instance that the two solenoid coils 100 and 106 respond respectively to current and voltage variations of a generator. The control device should be arranged such that the current intensity or the voltage of the generator would remain substantially constant, at any rate that any of these values whatever they may be, are prevented from exceeding a maximum value. This requirement which is usually made in electric power plants can be fulfilled in the present case in such manner that the primary impulse for diminishing the excitation of the generator can be given by one primary control element alone whereas the impulse for increasing the excitation of the generator must be given by both control elements in common. In other words one control element alone cannot bring about by its own action the increase of the excitation unless the other control element joins in this tendency, however independent of the other control element its own action may be otherwise.

The auxiliary pump 156 may be driven from a suitable source of power (not shown) from which for instance shaft 175 is driven. The auxiliary pump has its intake at 112 as shown.

In hydraulic servo motors of the character described it has been customary heretofore to provide two main oil pumps, one for each side of the servo motor piston. The provision of two of such pumps is necessary for certain practical reasons. However, inasmuch as the space within which it is advisable to confine the entire mechanism of the servo motor, together with its controlling valves, is comparatively small, the arrangement of two main oil pumps becomes very inconvenient.

For this reason I prefer to provide, instead of two individual independent main oil pumps, one single gear pump with three gear wheels as is shown in Figure 2 at 157, 157$^a$ and 157$^b$. In this case, the central gear wheel 157$^a$ of the pump is driven from a power source (not shown here) and is common to both sides of this duplex pump. As will be noted from the figure, the right hand side of the pump comprising gears 157$^a$ and 157 discharges at the top through duct 131 directly into the chamber 133 of the servo motor, and has its intake at the bottom at 128. The left hand side of the gear pump, comprising gears 157$^a$ and 157$^b$ has its discharge side at the bottom and discharges through duct 130 directly into chamber 132 of the servo motor, whereas the pump intake is at the top through intake duct 129. The pump is assumed to operate continuously, and therefore, pressure fluid is continually furnished by both sides of the pump into the respective chambers of the servo motor. However, from duct 130 a by-pass 134 leads to the restricted portion 136 of piston valve 104, the edges 140 and 141 of this restricted portion being located in two converging planes as shown. Similarly a by-pass duct 135 leads from main pressure fluid duct 131 to the restricted portion 136. If we assume for the moment a position of the restricted portion 136 symmetrically to both ducts 134 and 135 it will be noted that both ducts are substantially closed. However, in view of the fact that piston valve 104, as has been described at the beginning, is rotated through the gearing at the bottom, it will be seen that when the longer portion of the restriction 136 registers symmetrically with the two by-pass ducts 134 and 135—i. e. after 180° revolution—both by-pass ducts will be partially uncovered and the oil pressure on both sides of the servo motor be uniformly released by discharge of pressure fluid from the restricted portion 136 through discharge port 137. By this intermittent release of the pressure fluid an excess pressure in the system is avoided. Besides by these means the oil pump is put under heavy load only for a very short time, i. e. once for every revolution of the piston valve 104. During the rest of the period the fluid has only a comparatively low pressure, so that in the average the energy required for operating the pump is only small. The great advantage of thus throttling and releasing the oil supply is a very great sensitiveness of the servo motor in so far as response to the valve control is concerned. The further advantage is that at the same time the average load on the pump is very small. If now, through the action of the primary control elements described hereinbefore, control piston valve 104 should rise, by-pass duct 134 will be more uncovered and thus will discharge more oil than duct 135 until duct 135 becomes closed entirely, so that the maximum fluid pressure is established in chamber 133 of the servo motor, whereas a very low fluid pressure will exist in chamber 132 with the result that the servo motor piston 144 will revolve counter-clockwise. If on the other hand, piston valve 104 should drop, the reverse motion of servo motor piston 144 will result. The converging control edges 140 and 141 of the sliding valve 104 have furthermore the great advantage that the motions of the servo motor piston 144 will gradually increase in speed with the gradual control motions of sliding piston 104 in one or the other direction, whereas if the two controlling edges 140 and 141 of the restricted piston portion 136 were parallel to each other, at the slightest control motion of the piston 104 in one or the other direction, the servo motor piston 144 would immediately operate at full speed. This would immediately cause over-regulation of the object which is operated by the servo motor with the result that so-called "hunting" is produced, that is to say, the effect of the over-regulation would produce immediately a reaction on the primary control elements, which in turn, would immediately cause the regulation of the servo motor in the other direction, which again would be apt to produce an over-regulation and so forth.

In order to definitely limit the oil pressure in the main pressure fluid sytsem to a certain safe value, safety valves 138 are connected to the main ducts 130 and 131 which discharge the oil into the container in case this pressure is exceeded.

In order to provide means for stopping the main pressure fluid supply after the servo motor piston 144 has reached the end of its path in one or the other direction, the following means are provided: On the servo motor shaft 143, outside of casing 142, is fastened a radial arm 149, which is provided at its outer end with two abutment pins 146 and 147 pointing in opposite direction. As soon as the servo motor piston has attained the end of its stroke on either side, abutment pins 146 or 147 will engage stop 148 which is fixed to fluid control sleeve 103.

The head or abutment end of stop 148 is assumed in the drawings to be sufficiently offset relatively to coil 100 so that the end of radial arm 149 will not strike coil 100 when it swings around during the operation of the servo-motor. The engagement of stop pins 146, 147 with stop 148 will return the sleeve 103 from its extreme end position— either the upper or lower one—into which it may have been shifted by the motions of armature 101, into the middle position by which the auxiliary pressure fluid is released through port 118 to such an extent that control piston valve 104 is brought back into its middle position in which the main pressure fluid is uniformly and intermittently discharged from both sides of the piston as described hereinbefore.

The operation of the entire device is as follows:—

Let us assume that the magnetic pull produced by the coils 106 of the primary control element, on armature 107 be smaller than the downward pull of spring 108, so that armature 107 would come to rest upon its lower abutments 139 in which position port 123 is closed. If now at the same time the current in the circuit to which coils 100 of the other primary control element are connected should rise, armature 101 is raised against the tension of its spring 102, which will uncover port 118 further and thus diminish the auxiliary fluid pressure in annular space 115, so that spring 126 will lift the piston valve 104 and continue doing so until port 118 is again sufficiently covered to restore an auxiliary fluid pressure in space 115 which is capable of balancing the pressure exerted by spring 126. If thus piston valve 104 is raised, the passage from by-pass port 135 into the restricted portion 136 is closed, so that in chamber 133 a greater pressure exists than in chamber 132, which as has already been previously stated, will turn the servo motor piston 144 counter-clockwise and bring about the operation of the object to be operated—for instance a rheostat arm 27ª in Figure 1—thus bringing about a reduction of the current in coils 100. If by the regulating action of armature 101 just described, sleeve 103 should have been only lifted a very short distance (for instance less than one millimeter) the passage through by-pass duct 135 does not become entirely closed, but owing to the inclined positions of control edges 140 and 141 may be opened for discharge of pressure fluid, let us say only once for every revolution of piston valve 104. This results in producing an excess pressure in chamber 133 only intermittently and thus in the average not the maximum pressure of the fluid which the right hand side of the main pump is capable of delivering will be exerted against piston 144, which in turn, has the result that piston 144 is not moved at full speed, but will only perform short quickly succeeding regulating motions. Only when control sleeve 103 is raised a great distance which entirely uncovers port 118 the full speed of piston 144 will be attained as described hereinbefore. The reverse would occur when the dropping of sleeve 103 brings about a dropping of control piston valve 104.

If on the other hand, the current should rise in coils 106 of the other primary control element, sleeve 109 is raised and opens port 123 to a larger extent, so that again the pressure in annular spaces 120 and 115 will drop, which in turn, would cause springs 126 and 127 to lift their respective piston valve 104 and 110. During this control movement by-pass 135 for the main pressure fluid is likewise more or less throttled and thus the servo motor piston 144 will again move counter-clockwise, however, irrespective of the position of sleeve 103 of the other primary control element at that time. This movement of servo motor piston 144 will continue until the effect of its regulation has brought about sufficient de-energization of coils 106 to cause the dropping of armature 107 and thus of sleeve 109 by which discharge port 123 and through the dropping of sleeve 103, discharge port 118, are closed to a sufficient extent to restore sufficient pressure in spaces 115 and 120 against springs 126 and 127 which will bring the sliding piston valves 104 and 110 back to their middle position.

I claim:—

1. In a power control system a servo motor having hydraulic operating mechanism comprising a main pressure fluid control valve, a plurality of primary control elements disposed and acting independently of each other, and being responsive individually to different requirements of the object to be controlled, a preliminary fluid control means for and operatively connected to each primary control element, a source of auxiliary pressure fluid supply controlled by said primary control elements for operating said preliminary fluid control means as required by said individual primary elements, said preliminary control means being suitably connected to cause the operation of the main control valve, to permit response of the servo motor to one of the several requirements of the object to be controlled by it, irrespective of the other requirement, within predetermined limit values of said other requirement.

2. In a power control system a servo motor having hydraulic operating mechanism comprising a main pressure fluid control valve, a plurality of primary control elements disposed and acting independently of each other, and being responsive individually to different requirements of the object to be controlled, a plurality of preliminary control pistons, one for each primary control element and a source of auxiliary pressure fluid adapted to jointly operate said pistons, and means acting upon said pistons for counteracting said auxiliary fluid pressure, fluid discharge control means connected to each primary control element for individually bringing about the discharge of auxiliary pressure fluid for causing uniform movement of said control pistons, said main pressure fluid control valve being connected to one of said control pistons to permit response of the servo motor to one of the several requirements of the object to be controlled by it, irrespective of the other requirement within predetermined limit values of said other requirement manifested by the control position of the other primary element.

3. In a power control system a servo motor having hydraulic operating mechanism comprising a main pressure fluid control valve, a plurality of primary control elements disposed and acting independently of each other and being responsive individually to different requirements of the object to be controlled, a plurality of preliminary control pistons, one for each preliminary control element, and a source of auxiliary pressure fluid adapted to jointly operate said pistons and means acting upon said pistons for counteracting said auxiliary fluid pressure, fluid discharge control means connected to each primary control element for individually bringing about the discharge of auxiliary pressure fluid for causing uniform movement of said control pistons, said main pressure fluid control valve being connected to one of said control pistons to permit response of the servo motor to one of the several requirements of the object to be controlled by it, irrespective of the other requirement within predetermined limit values of said other requirement manifested by the control position of the other primary element, and means connected to said servo motor for throwing one of said primary control elements into "stop motor" position when the extreme operating positions of the servo motor have been reached.

HANS THOMA.